United States Patent
Carroll

(10) Patent No.: US 12,480,253 B2
(45) Date of Patent: Nov. 25, 2025

(54) INFUSION OF FORMULATED AND TREATED SILICONE INTO SILK FABRIC TO CREATE STRUCTURE AND DECORATIVE DESIGN

(71) Applicant: Nancy Dill Carroll, Chula Vista, CA (US)

(72) Inventor: Nancy Dill Carroll, Chula Vista, CA (US)

( * ) Notice: Subject to any disclaimer, the term of this patent is extended or adjusted under 35 U.S.C. 154(b) by 365 days.

(21) Appl. No.: 18/452,538

(22) Filed: Aug. 20, 2023

(65) Prior Publication Data

US 2024/0254689 A1     Aug. 1, 2024

Related U.S. Application Data

(60) Provisional application No. 63/482,005, filed on Jan. 27, 2023.

(51) Int. Cl.
*D06Q 1/08*        (2006.01)

(52) U.S. Cl.
CPC ..................... *D06Q 1/08* (2013.01)

(58) Field of Classification Search
CPC ....................................................... D06Q 1/08
See application file for complete search history.

(56) References Cited

U.S. PATENT DOCUMENTS

| | | |
|---|---|---|
| 9,176,167 B1 * | 11/2015 | Chen ........................ G01R 3/00 |
| 2018/0171192 A1 * | 6/2018 | Abrams ...................... C09J 7/35 |
| 2018/0304600 A1 * | 10/2018 | Ito .......................... B32B 27/065 |

* cited by examiner

*Primary Examiner* — Andrew T Piziali

(57) ABSTRACT

A multi-step process involves formulation and treatment of silicone to break the surface tension transforming silicone texture from traditional rubbery-feeling to smooth satin finish. A low viscosity, translucent silicone rubber compound is separated and cured at room temperature. Part A (Base) is modified to include silicone thinner. Part B (Catalyst) is modified to include retarder. Both Parts A and B are weighed to equal parts. Part A is further modified by including color pigment and colorized mica powder. Parts A and B are mixed at a 1:1 ratio. This formulated silicone is poured into a syringe and applied to hand-painted silk fabric to create scarf border and decorative design. Silicone is allowed to set. Silicone is then treated by: (1) applying 170° heat for period of time, contingent on air temperature and humidity; and (2) dusting and lightly brushing the silicone with a 50/50 mixture of mica and rice powder.

1 Claim, 3 Drawing Sheets

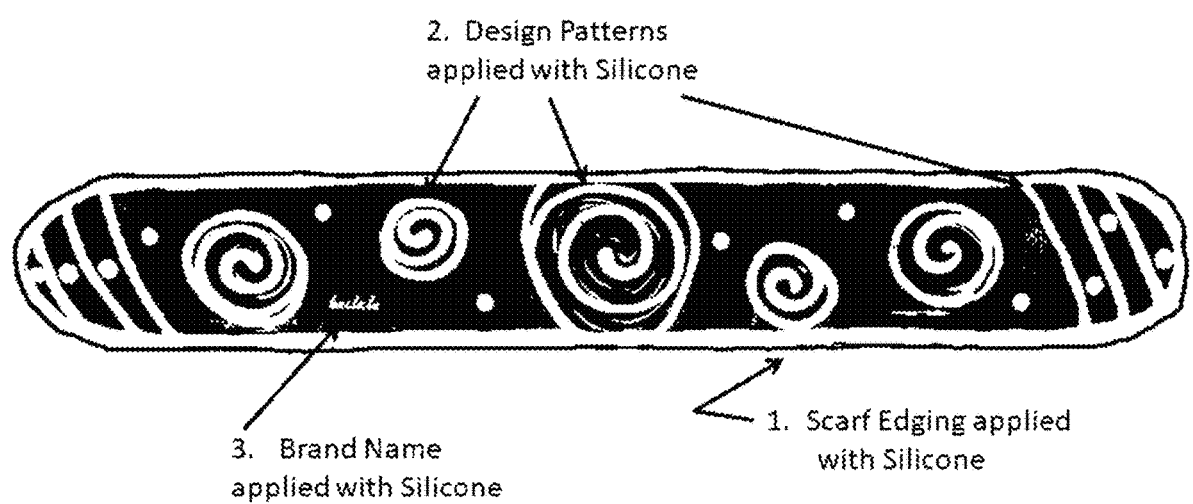
**Figure 1. Frontal View of Typical Finished Silk + Silicone Scarf: *Sample 1***

Figure 2. Frontal View of Typical Finished Silk + Silicone Scarf: <u>Sample 2</u>
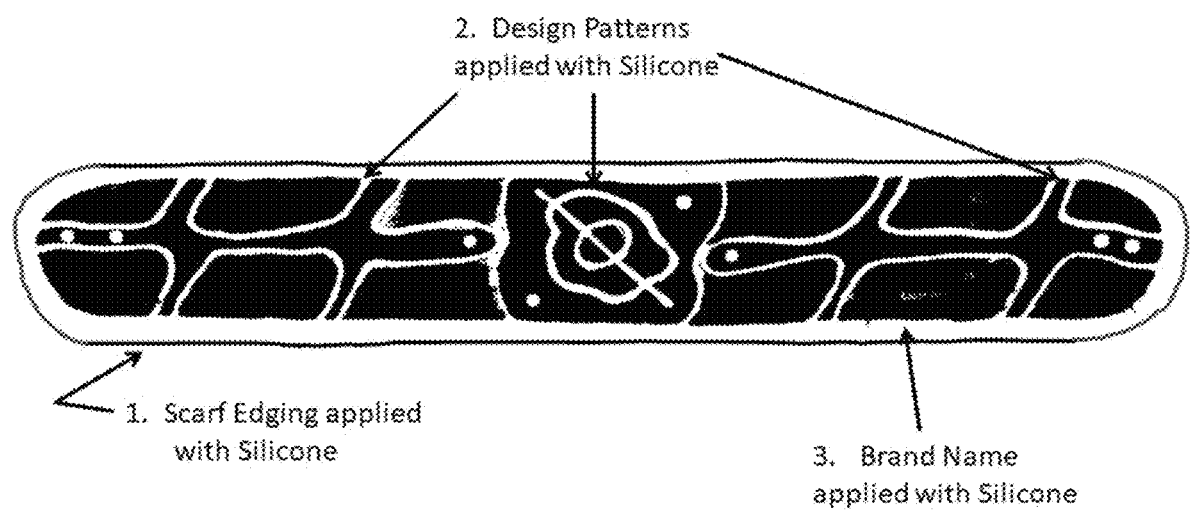

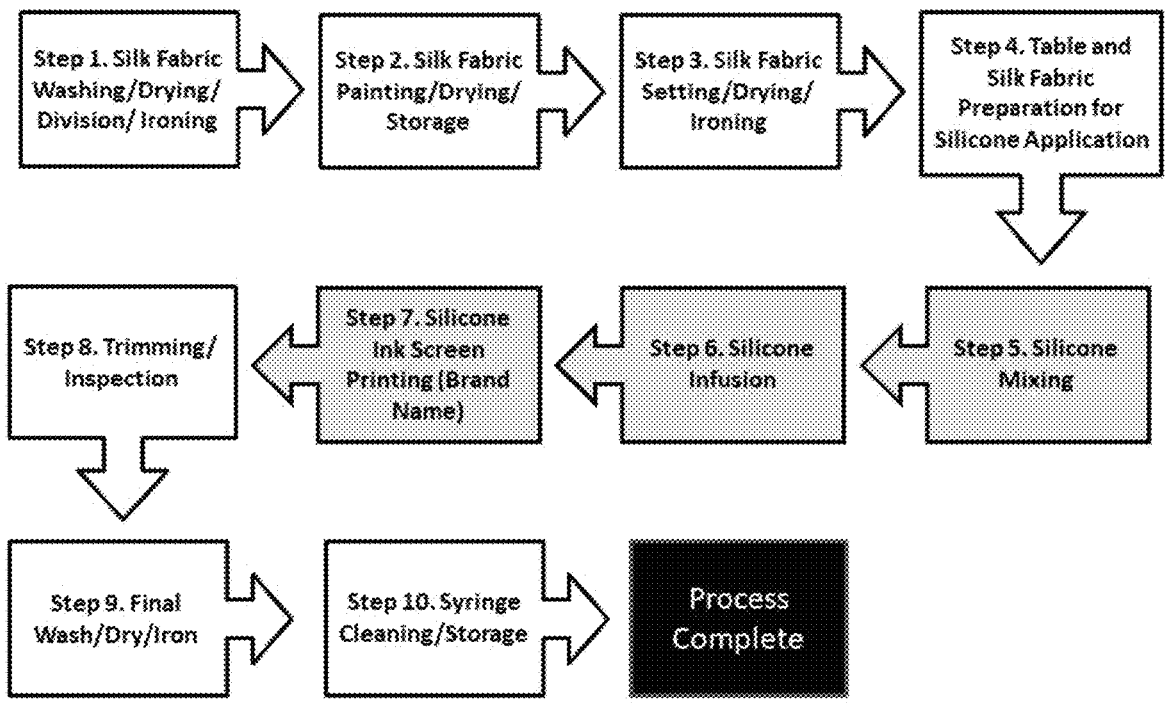

INFUSION OF FORMULATED AND TREATED SILICONE INTO SILK FABRIC TO CREATE STRUCTURE AND DECORATIVE DESIGN

CROSS REFERENCE TO RELATED APPLICATIONS

This application makes claim to the benefits derived from previously filed Provisional Utility Patent Application No. 63/482,005, filed on Jan. 27, 2023.

BACKGROUND

Women's fashion garments, specifically silk scarves, are manufactured with raw silk that is woven, spun, knitted, bleached and, if desired, dyed with acidic or neutral dyes. Design patterns are introduced by digital or screen printing to create graphic designs or traditional painting to create artistic designs. The finishing application gives a sheen to the silk while also making the silk fabric fire and crease resistant. Hand-sewn rolled edging or loose whip stitch edging is made to the cut scarf fabric. The stitched/hemmed edging is often subject to unraveling and fraying. Although fashionable, silk scarves are slippery by nature and tend to fall off the shoulders and not properly drape. Wearers are required to hold the silk scarf in place with a needled or magnetic brooch. Needled brooches tear a hole in the silk fabric that will enlarge over time.

SUMMARY

An innovative multistep process has been developed that breaks the surface tension of traditional silicone to enable its application in the manufacturing of silk scarves. This multistep process involves the formulation and treatment of silicone to transform the silicone texture from a rubbery-feeling to a soft, smooth finish, similar to satin ribbon. This transformation of the silicone enables the silicone to be successfully applied to silk fabric to create a silk scarf with structure and decorative design. The infusion of this formulated and treated silicone into the silk fabric ensures that: 1) the need for a stitched/hemmed edging of a traditional silk scarf has been completely eliminated by applying the formulated and treated silicone to the outer edges of the scarf; 2) the formulated and treated silicone will not separate (i.e., crack, peel and/or break off) from the silk fabric thereby becoming a permanent part of the decorative design of the silk scarf; and 3) the finished silk+silicone scarf will properly drape without the need for a needle or magnetic brooch. This application of formulated and treated silicone to silk fabric is unique in fashion manufacturing.

DESCRIPTION OF DRAWINGS

FIG. 1 provides a frontal view of a finished silk+silicone scarf (Sample 1).
  [Step 1] illustrates the application of the formulated and treated silicone to the hand-painted silk fabric to create the scarf edging that negates the need for sewing or stitching.
  [Step 2] illustrates the application of the formulated and treated silicone to create the decorative design of the silk scarf.
  [Step 3] illustrates the application of the silicone to create the brand name.

FIG. 2 provides a frontal view of another finished silk+silicone scarf (Sample 2).
  [Step 1] illustrates the application of the formulated and treated silicone to the hand-painted silk fabric to create the scarf edging that negates the need for sewing or stitching.
  [Step 2] illustrates the application of the formulated and treated silicone to create the decorative design of the silk scarf.
  [Step 3] illustrates the application of the silicone to create the brand name.

FIG. 3 provides a process flow chart illustrating the steps to complete a finished silk+silicone scarf that corresponds to the Detail Description set forth herein.

DETAILED DESCRIPTION

Provided herein are the various steps in the production process to create silk+silicone scarves invented by the applicant. The specific steps pertaining to the preparation and infusion of the formulated and treated silicone into the silk fabric to create the finished scarf's structure and decorative design are outlined in Steps Nos. 5, 6 and 7.

Step 1. Silk Fabric Washing/Drying/Division/Ironing
  Cut white silk fabric yardage into desired length (approximately 72 inches).
  Wash white silk fabric in hot water and Dharma Pro Fabric Detergent to remove dirt, oils, etc. from manufacturer/supplier handling.
  Drape the large swathes of silk fabric over rack to dry.
  Once dried, iron the large swathes of silk fabric to determine actual size. NOTE: Silk shrinks approximately 14% when first washed from manufacturer, so ironing helps determine and diminish relative shrinkage.
  Cut silk fabric into desired strips (e.g., 70 inches×10 inches OR 60 inches×9 inches).
  Place silk fabric strips on hangers organized by strip size and silk type (ex: crepe or habotai).

Step 2. Silk Fabric Painting/Drying/Storage
  Stretch the clean and ironed silk fabric onto a stretcher frame.
  Mix and prepare desired French dye colors.
  Fill large and small containers with water to clean brushes.
  Sketch the design on to silk fabric using a fading fabric marker.
  Apply French dye/paints in phases with lighter colors applied first, then let dry. Dry the dye of each color by placing the frame outdoors under the sun for approximately five (5) minutes before applying the next color.
  As needed, use heat gun on low temperature setting (150°) to stop the dye color from spreading.
  Once entire piece of silk fabric is completely painted and dyes are dry, place the silk fabric on a clothing rack for 2-4 days to let dyes soak into silk fibers.

Step 3. Silk Fabric Setting/Drying/Ironing
  After painted silk fabric has hung for 2-4 days, DRY iron the silk fabric on both sides, then roll around cardboard tube.
  Separately insert PVC pipe into cardboard tube around which the painted silk fabric has been wound. Set aside on clean stainless steel table.
  Clean surface of outdoor work table to eliminate any accumulated debris (leaves, dust, etc.)
  Place three plastic tubs in a row, with the largest (blue) plastic tub first on top of the outdoor work table.

Wear long sleeve shirt, long pants, closed shoes, face mask and safety glasses to avoid skin contact with Jacquard™ Chemical Set.

Fill first plastic tub with three (3) gallons of water and seven (7) tablespoons of Jacquard™ Chemical Set.

Fill second plastic tub with two (2) gallons of water and approximately one (1) teaspoon of Dharma™ Pro Fabric Detergent.

Fill third plastic tub with two (2) gallons of clear water.

With DRY gloves, hold the silk fabric on cardboard tube+PVC pipe tilted slightly upward.

Place one end of the silk fabric into the Dye Set bath.

With a stainless steel or plastic spatula, quickly roll the silk fabric from the tube into the bath to completely immerse the silk fabric into the bath.

Using a spatula, gently swish the silk fabric in the dye bath for 60 to 90 seconds. Avoid splashing the bath on yourself.

Lift the silk fabric out of the dye bath with the spatula. Run gloved hand over silk fabric to remove excess bath water.

Plunge silk fabric in detergent bath and swish thoroughly for 30 to 60 seconds, then remove from detergent bath.

Plunge silk fabric into clear rinse water and swish thoroughly. Remove and wring gently with gloved hand to remove excess water.

Unfurl silk fabric and place on very clean drying rack.

Once all pieces of painted silk fabric have been set and placed on drying rack, rinse each scarf again under running water and return to drying rack. NOTE: This double rinse helps ensure that all detergent is removed.

Step 4. Table and Silk Fabric Preparation for Silicone Application

Inspect stainless steel table surface for dust, oil, little flecks of old silicone, dye and/or paint residue.

Clean table with Windex with Vinegar™ and paper towels, drying thoroughly.

Repeat cleaning table with 91% isopropyl alcohol to remove Windex and any remaining potential contaminants or surface debris.

Iron silk fabric to remove as many wrinkles as possible.

Lay silk fabric on one-half of table length.

Use Frog Tape™ to secure silk fabric to table as flatly and straight as possible, to avoid wrinkling or "bubbles" or raised areas in the fabric.

Repeat steps 4-6 for two pieces of painted and dye-set silk fabric.

Step 5. Silicone Mixing

ADVISORY: Ideal condition for silicone mixing is 75° average humidity.

Tear off approximately 12 inches of freezer paper. Tape the freezer paper to one work surface.

Mark one small 3-oz paper cup "A" and one 3-oz paper cup 'B".

Place both small 3-oz paper cups and three (3) fresh balsa stir sticks on freezer paper.

Mark one wooden paint stir stick "A." Mark other wooden paint stick "B".

Open containers of Dragon Skin™ 10 NV ("DS10NV"), Parts A (Base) and B (Catalyst). (NOTE: Dragon Skin™ 10 NV is a low viscosity, translucent silicone rubber compound.)

Use paint stick marked "A" to thoroughly stir DS10NV Part A, lifting any globs of denser liquid from bottom of bucket so that they dissolve thoroughly into lighter liquid.

Scrape excess liquid from stick against the lip of bucket. Then wipe paint stick "A" clean with paper towel.

Place lid lightly back on bucket.

Follow the same steps with paint stick marked "B" and DS10NV Part B.

Let both DS10NV Parts A & B sit in room temperature for 15 to 20 minutes to reduce air bubbles.

Using plastic container with lid, dispense 300 grams DS10NV Part B. Add three (3) grams of SLO-JO Retarder™. Mix thoroughly and set aside nearby.

Place cap on a 100 ml Catheter syringe, then place syringe without plunger into inverted 12-oz paper cup to hold it upright.

Inspect syringe plunger to ensure plunger is free of errant bits of silicone. Set syringe plunger aside but nearby, on clean work surface.

Place clean 12-oz mixing cup on weight scale. Use Tare function to remove weight of cup from read-out so that it shows 0.

Move the DS10NV Part A bucket to mixing work surface.

Using small 3-oz paper cup marked "A," dip into silicone DS10NV Part A to almost full. (You're using the cup like a ladle.)

Using a balsa stir stick dedicated exclusively for DS10 NV Part A, scrape off excess Part A silicone from ladle cup back into bucket.

Pour out 60 grams of DS10NV Part A into 12-oz mixing cup on scale.

Pour out any excess DS10NV Part A in the "ladle" cup back into Part A bucket and place ladle cup and stir stick on freezer paper.

Dispense three (3) grams of Silicone Thinner™ into DS10NV Part A in 12-oz mixing cup. This reduces the viscosity and shore hardness of the final silicone formulation.

Using another clean stir stick exclusively for SilcPig™ color pigment, place a pea-size amount of SilcPig™ color pigment into 12-oz mixing cup with Part A plus Thinner.

Shake approximately one (1) gram of gold or silver mica powder into 12-oz mixing cup containing Part A plus Thinner.

Using another clean stick dedicated only to mixing together DS10 NV Parts A & B, stir Part A plus Thinner, SilcPig™ and Mica powder together thoroughly for approx. 20 seconds. Check to ensure there are no lumps.

Return the mixing cup with this mixture to weight scale and press Tare function to return read-out to 0.

Return the DS10NV Part A bucket to separate work surface.

Move the DS10NV Part B plus Retarder container to mixing work surface.

Using small 3-oz paper cup marked "B," dip into DS10NV Part B plus Retarder to almost full. (NOTE: You're using the cup like a ladle.)

Using a balsa stir stick dedicated exclusively for DS10NV Part B, scrape off excess Part B silicone from the cup back into container.

Pour out 60 grams of DS10NV Part B plus Retarder into mixing cup on scale.

Pour out any excess DS10NV Part B in the "ladle" cup back into Part B plus Retarder container. Place paper cup and stir stick on freezer paper.

Move the DS10NV Part B plus Retarder container back to separate work surface.

Thoroughly mix DS10NV Part B plus Retarder into Part A plus Thinner (which now includes SilcPig™ color pigment and gold or silver mica powder) for at least 90 seconds, scraping the sides often and making sure to move silicone at cup bottom to top several times.

Once mixed, hold cup high over syringe sitting in inverted cup. Pour mixture into the syringe, then place plunger into syringe.

Wipe off the mixing stick with paper towel for next batch of silicone to be mixed.

Remove syringe with cap and plunger from inverted paper cup and flip syringe so Catheter syringe tip and cap are pointing up.

Wait about 10 seconds to let formulated silicone in syringe flow downward toward plunger.

Remove cap, and wipe syringe tip thoroughly with paper towel.

Make sure plunger is "seated" stably in syringe.

Step 6. Silicone Infusion

Using steady pressure, dispense the formulated silicone from the syringe onto the silk fabric taped onto the stainless steel table. Dispense the formulated silicone onto the silk fabric to create the border edging that will define the shape, size and structure of the scarf. (See Step [1] of attached Figures No. 1 and No. 2.)

Draw the design within the silk scarf border applying the formulated silicone. (See Step [2] of attached Figures No. 1 and No. 2.)

Using a timer, let the mixed silicone soak through and into fabric for five (5) minutes.

Using timer, treat the silicone by applying 170° heat to all silicone for approximately 5-10 minutes, depending on air temperature and humidity, working on border first in quarter (¼) sections, then interior design.

When the silicone appears to be approximately 75-80% cured, using a one-inch Royal and Langnickel L279 extra soft natural hair brush, immediately dust with 50/50 mixture of gold or silver mica and rice powder. Barely touch the brush to the treated silicone. Use the brush to very gently push the powder mixture onto the surface of the silicone. NOTE: The heating of the silicone coupled with the brushing of the powder mixture breaks the surface tension of the silicone, transforming the texture of the treated silicone from a traditional rubbery-feeling to a smooth satin finish.

Depending on the temperature, let the silicone-applied scarf sit for 10-20 minutes. More time may be required if room temperature is cold. If room temperature is below 75° F., set temperature on heat gun to 300° F. and place on shelf below stainless steel table's work surface with the nozzle pointing up toward the work surface under the scarf. Move the heat gun on the shelf to follow the length and width of the scarf in ¼ sections. This will heat the stainless steel work surface and speed the curing time of the dispensed silicone. This step could take from 10-20 minutes.

After setting, check for any treated silicone on the table, but not on the scarf, to see if treated silicone has cured enough to peel off cleanly.

When the treated silicone is cured enough to peel off cleanly, working in quarter (¼) sections, peel up the silicone scarf from the table. Powder the silicone on the back side of the scarf with the gold or silver mica and rice powder mix, brushing the powder on to the tacky (very slightly sticky) silicone surface. Use a two-inch Royal & Langnickel L279 extra soft natural hair brush for this step.

After one-half (½) of the back side of the scarf is powdered, use a one-inch Royal Glaze SG750 brush to stroke the silicone with light pressure. The stiffer bristles of this brush, combined with light stroke pressure, help disrupt the surface tension of the silicone that is now much more cured.

Once the entire back side of the scarf is powdered and stroked with stiffer bristle brush, lift the scarf from the table and gently shake the excess powder onto the table surface.

Hang the scarf vertically on a rack to cure for at least another 12 hours. Hang the scarf by clipping two corner areas of fabric outside the border edge to the rack, being careful not to apply pressure on the silicone that might shape the still-uncured silicone further. NOTE: DS10NV can cure almost completely in as little as two (2) hours in "perfect" atmospheric conditions. This additional 12-hour time period is preferred to ensure the silk+silicone scarf is ready for sale.

Using a small cardboard square, scrape the excess mica/rice powder into a pile. Scrape pile into mesh filter on top of mica/rice powder container to reclaim powder mixture free of bits of cured silicone.

Clean stainless steel table in three steps:

First: With water and paper towels, remove all powder. Then scrape off any treated silicone from table with plastic putty knife.

Second: With Windex with Vinegar™ and paper towels, wipe the table completely dry.

Third: With 91% isopropyl alcohol, wipe table completely dry. Make certain the table surface is spotlessly clean for next scarf.

After 12 hours, with several scarves on the curing rack, move the rack outdoors.

Spray the fronts and backs of each scarf with water using the "flat" spray nozzle of a garden hose.

Leave the rack outdoors, if possible, to let scarves completely dry.

Once dry, move to a hanger to await screen printing of brand name.

Step 7. Silicone Ink Screen Printing (Brand Name)

Use a 25"×36" frame stretched with 90 s polyester mesh coated with Murakami 300 n micron thick film with brand name exposed. Secure screen into clamps attached to stainless steel table.

Position the Nekoosa RTape pallet tape onto the stainless steel table where the brand name will be printed when the screen is level to the table. Adhere the pallet tape to table with pallet tape smoother.

Tape top and bottom edges of pallet tape to table.

With ruler and ballpoint pen, draw a rectangle to show placement of brand name.

With sponge brush, apply one (1) part high viscosity pallet glue to 3 parts water mixture to pallet tape over rectangle.

Use the heat gun to dry glue/water mixture.

Measure appropriate amounts and mix Avian Zodiac™ Libra Silicone Ink clear matte base (generally 40 grams), gold or silver mica powder (2 grams), SilcPig™ color pigment (pea-size dot), retarder (generally 1% relative to amount of silicone ink) and catalyst (5% relative to amount of silicone ink) together.

Determine where the brand name should be placed on scarf and press only the silk section of the scarf onto the pallet tape where glue/water mixture is applied. Do not print brand name onto silicone edge or design of scarf.

Lower screen almost flat to the stainless steel table but slightly raised. Flood slightly raised screen with adequate amount of silicone ink. Lower the screen.

Screen print name onto scarf using silicone ink mix and squeegee. (See Step [3] of attached Figures No. 1 and No. 2.)

Flash dry at 275° for 60 to 90 seconds, depending on temperature and humidity, on pallete to initiate curing process.

Carefully lift scarf from palette and drape on rack without touching the screen-printed name.

Lightly brush gold or silver mica/rice powder mixture onto name—front and back.

Flash dry with heat gun at 275° for another 60 to 90 seconds.

Check to make certain silicone ink is completely cured.

Leave scarf on rack or move to hanger to await trimming and inspection.

Step 8. Trimming/Inspection

Lay scarf on cutting mat placed upon stainless steel table.

Use rotary blade trimmer to remove excess fabric from around the border.

Use small scissors and magnifying glasses for detail work.

Once completely trimmed, check for errant drips of silicone.

If present, dip a cotton swab in CCI JP-53 screen cleaner/solvent and rub on front and back of errant silicone drip.

Scrape lightly, if necessary, to lift out silicone drip.

Step 9. Final Wash/Dry/Iron

Hand wash the scarf in cold water with just a dash of mild fabric detergent to remove solvent and any remaining mica powder from silk fabric.

Rinse finished silk scarf thoroughly with cold water.

Hang scarf on rack to dry.

Once dry, iron on back side of finished silk scarf to prepare for packaging.

Step 10. Syringe Cleaning/Storage

Fill plastic tub with soapy water.

Fill one tin foil tray with 100% acetone.

Fill another tin foil container with 91% isopropyl alcohol.

Remove the plungers and, as much as possible, any residual cured silicone from inside and outside of syringes.

Wearing gloves and face mask, soak paper towel with acetone and clean remaining silicone from outside of syringes.

Soak the syringes in acetone bath.

Remove rubber gasket from plungers and soak gaskets in alcohol bath.

Scrub inside of syringes with paper-towel wrapped stir stick soaked with acetone to remove silicone from inside.

Place scrubbed syringe in soapy water bath.

Scrub the gaskets with toothbrush to remove all silicone.

Place the gaskets in soapy water bath.

Bring cleaned syringes and gaskets to sink to be rinsed.

Place cleaned syringes and gaskets on dishtowel to dry.

The invention claimed is:

1. A method of making a silicone infused silk fabric scarf, the method comprising:

obtaining a silk fabric scarf comprising a front surface and a back surface;

applying silicone to the front surface of the silk fabric scarf such that the silicone soaks through the silk fabric scarf to the back surface;

applying a heat treatment to partially cure the silicone;

applying a first powder mixture comprising mica powder and rice powder to the front surface such that the first powder mixture breaks a surface tension of the silicone resulting in a front surface having a smooth satin finish;

applying a second powder mixture comprising mica powder and rice powder to the back surface such that the second powder mixture breaks a surface tension of the silicone resulting in a back surface having a smooth satin finish; and fully curing the silicone.

* * * * *